United States Patent Office 3,616,681
Patented Nov. 2, 1971

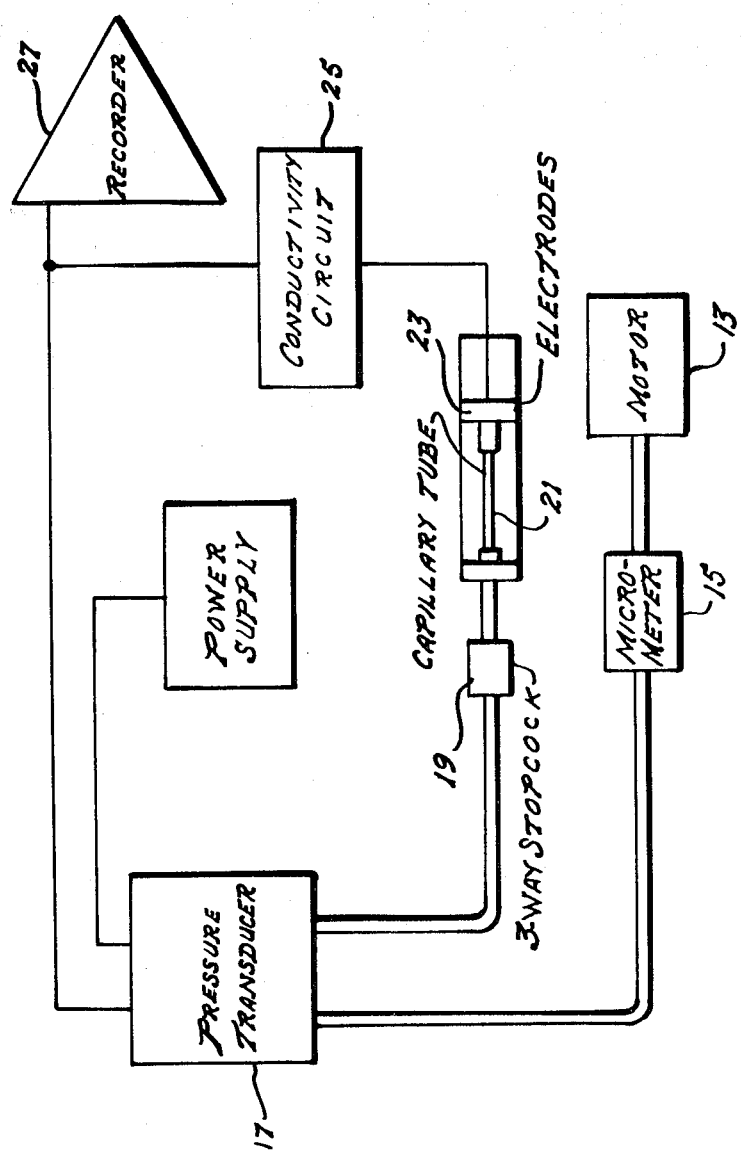

3,616,681
ELECTRODE SYSTEM FOR SURFACE TENSION DETERMINATION OF FLUIDS
Leopoldo L. Rodriguez, 5511 Rolling Dale, San Antonio, Tex. 78228; Kenneth G. Ikels, 28 Ridge Drive, New Braunfels, Tex. 78130; and James Ryan Neville, 213 Tuttle Road, San Antonio, Tex. 78209
Filed Dec. 16, 1969, Ser. No. 885,575
Int. Cl. G01n 13/02
U.S. Cl. 73—64.4
3 Claims

ABSTRACT OF THE DISCLOSURE

An electrode system is attached relative to a capillary tube so that an electrical circuit is completed when the meniscus in the capillary tube holding the sample flattens out as pressure is applied by a motor driven micrometer through a pressure transducer. When this occurs, the conductive properties of the solution close a conductivity circuit which applies a voltage to a recorder thus indicating the end point. The pressure noted at this point is used in the calculation of the surface tension of the liquid sample.

BACKGROUND OF THE INVENTION

This invention relates to an electrode system for detection of end point in the determination of surface tension and, more particularly, the invention is concerned with providing improved apparatus for the determination of surface tension including a pressure transducer, pressure applicator and an electrode system which utilizes the conductive properties of the samples to determine the pressure end point for the calculation of surface tension.

The force acting in the surface of a liquid, tending to minimize the area of the surface is known as surface tension. Surface forces or, more generally, interfacial forces, govern such phenomena as the capillary rise of liquid in fine tubes and the curvature of free-liquid interfaces.

In the body of a liquid, the time-averaged force exerted on any given molecule by its neighbors is zero. Even though such a molecule may undergo diffusive displacements because of random collisions with other molecules, there exist no directed forces upon it of long duration. It is equally likely to be momentarily displaced in one direction as any other. In the surface of a liquid, the situation is quite different; beyond the free surface, there exists no molecules to counteract the forces of attraction exerted by the molecules in the interior for molecules in the surface. In consequence, molecules in the surface of a liquid experience a net attraction toward the interior of a drop. These centrally directed forces cause the droplet to assume a spherical shape, thereby minimizing both the free energy and surface area.

Liquids which wet the walls of fine capillary tubes rise to a height which depends upon the tube radius, the surface tension, the liquid density, and the contact angle. A balance exists between the force exerted by gravity on the mass of liquid raised in the capillary and the force caused by surface tension. The shape of the free surface of a liquid in a vessel is only an approximation to a plane. In narrow tubes the meniscus of a liquid is concave upward if the liquid wets the tube, and conversely convex upward if it does not wet the tube. From the macroscopic point of view, surface tension may be regarded as a force exerted normally to a unit length in the surface.

SUMMARY OF THE INVENTION

The present invention provides a system for determining the surface tension of a biological fluid by utilizing the conductive properties of the sample. The system uses a motor driven micrometer, pressure transducer, capillary tube holding the sample, and an electrode system for detecting the end point. The electrode system is attached relative to the capillary tube so that an electrical circuit is completed when the meniscus in the capillary tube flattens out as pressure is applied by the micrometer through the pressure transducer. Two embodiments of the electrode system are disclosed, the first using two electrodes in precise alignment so that, as the meniscus flattens, it contacts the two electrodes thereby completing the circuit. A second embodiment uses a single electrode at the open end of the capillary tube where the meniscus is located, the other electrode being connected to any convenient position on the external surface of the capillary and by suitable choice of voltage, the end point will be indicated by the small charge transfer when contact is made by the indicator electrode.

Accordingly, it is an object of the invention to provide a unique method and apparatus for determining surface tension in biological fluid with a minimum of sample and a minimum of time.

Another object of the invention is to provide apparatus for the determination of the end point when the meniscus of the liquid in the capillary becomes plane.

A further object of the invention is to provide an apparatus which utilizes the conductive properties of the sample by means of an electrode system so arranged as to indicate when the meniscus of the sample in the capillary becomes flat.

Still another object of the invention is to provide an electrode system for the determination of surface tension wherein the conductive properties of the solution operate to close a conductivity circuit and apply a voltage to a recorder when the sample in the capillary becomes flat, thus indicating the end point.

These and other objects, features and advantages will become more apparent after considering the description that follows taken in conjunction with the attached drawings wherein like numbers are used throughout to identify like elements.

DESCRIPTION OF THE DRAWINGS

FIG. 1 shows a block diagram of the system according to the invention, including the necessary elements required for determining the surface tension;

DESCRIPTION OF A PREFERRED EMBODIMENT

Figure 3:
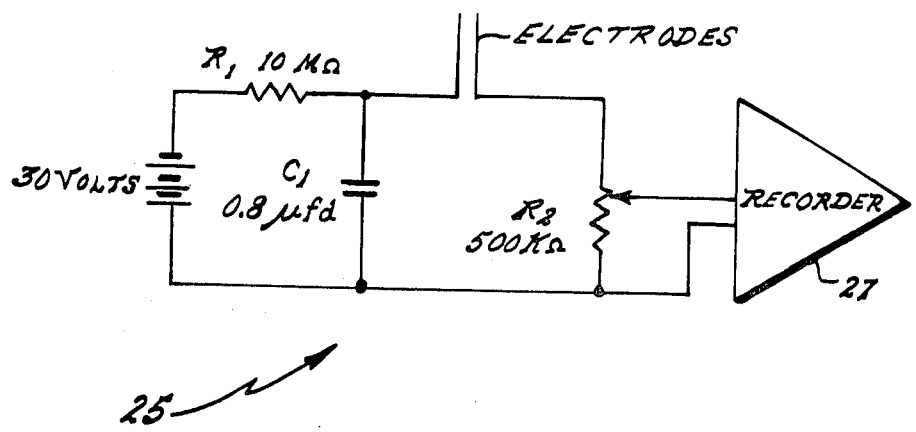
FIG. 3 is a view in schematic of the conductivity circuit which provides an electrical signal to the recorder when the circuit is completed.

Referring now to the drawings, there is shown an electrode system used in the determination of surface tension of liquids. In FIG. 1, there is shown a block diagram of the electrode system for the detection of end point in the determination of surface tension. A reversible motor 13 drives a micrometer 15 with a mercury reservoir. The micrometer 15, which can be manually operated if desired, is used to apply pressure to the system by causing a column of air trapped behind the fluid being tested to become compressed when the micrometer spindle is turned inward. The pressure is applied through a pressure transducer 17 to the 3-way stopcock 19. The capillary tube 21 is positioned on the other side of the stopcock 19 and receives the pressure from the micrometer 15.

As pressure is applied to the sample in the capillary 21, the meniscus nearest the electrodes 23 gradually flattens and becomes plane at which time contact is made with the electrodes, and by means of the conductivity circuit 25, an electrical signal is supplied to the recorder 27 which records the pressure applied thereby indicating that the end point has been reached. The pressure noted at this point is used in the calculation of the surface tension.

Figure 2:
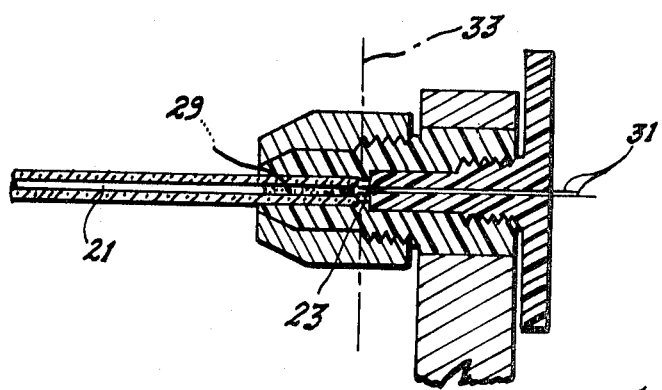
FIG. 2 is a view in cross-section showing the position of the electrodes in relation to the capillary and sample.

In FIG. 2, there is shown in detail a view of the electrodes 23 and the capillary tube 21 with the sample 29 disposed therein. The lead wires 31 from the electrodes 23 carry current to the conductivity circiut 25 when contact is made with the sample 29. In setting up the system, the electrodes 23 are positioned to abut the alignment plane 33 with the meniscus of the sample 29 being directly adjacent. Thus, it can be seen that when the pressure is applied to the sample 29 and the meniscus nearest the electrodes 23 gradually flattens contact will be made with the electrodes 23.

In FIG. 3, there is shown an example of the conductivity circuit 25 showing the various electrical components and their values as assembled in a typical circuit. When the circuit is completed at the electrodes 23, an electrical signal is provided to the recorder 27. This results in a voltage of opposite polarity superimposed on the recorder 27 causing an opposite deflection of pen giving a peak indicative of the applied pressure.

Taking advantage of the electrometer properties of field effect transistors, it is possible to construct a system in which a single electrode can be positioned in front of the meniscus to detect the planar condition of its surface. This simplifies the overall construction in that the two electrodes do not have to be precision aligned within the small area presented at the open end of the capillary 21. The indifferent electrodes in such a configuration may be placed at any convenient position on the external surface of the capillary and, by suitable choice of voltage, the end point will be indicated by the small charge transfer to the indicator electrode when the latter makes contact with the planar surface of the sample test solution.

Although the invention has been illustrated in the accompanying drawings and described in the foregoing specification in terms of preferred embodiments thereof, the invention is not limited to these embodiments or to the particular configurations mentioned. It will be apparent to those skilled in the art that our invention is readily adaptable for use in determining surface tension in biological fluids, such as human whole blood samples, with a minimum of sample and a minimum of time being required.

Also, it should be understood that various changes, alterations, modifications and substitutions with respect to the construction details can be made in the arrangement of the several elements without departing from the true spirit and scope of the appended claims.

Having thus described our invention, what we claim as new and desire to secure by Letters Patent of the United States is:

1. A system for determining the surface tension of a sample fluid in a capillary tube, said system comprising micrometer means for applying pressure to the fluid by causing a column of air trapped behind the fluid to become compressed when the micrometer spindle is turned inward, means for transforming the applied pressure into an electrical signal of corresponding intensity, a pair of electrodes in close proximity to the meniscus on the surface of the fluid in the capillary, a conductivity circuit activated when the surface of the fluid flattens and contacts said electrodes to complete an electrical circuit, and recorder means for providing a visible indication of the end point and pressure value where said fluid contacts said electrodes, the visible indication being proportional to the surface tension of the fluid in the capillary.

2. The surface tension determination system defined in claim 1 wherein the micrometer means for applying pressure to the sample fluid includes a reversible motor.

3. The surface tension determination system defined in claim 1 wherein the means for transforming the applied pressure into an electrical signal of corresponding intensity is a pressure transducer.

References Cited

FOREIGN PATENTS 196,356   5/1967   U.S.S.R. _____ 73—64.4

OTHER REFERENCES

El-Karim, A.A.: A Method for Measuring Surface Tension, in Amer. Journal of Physics, pp. 305–307, May 1948.

LOUIS R. PRINCE, Primary Examiner

V. W. ROSKOS, Assistant Examiner